Jan. 30, 1962 W. W. HARRIS 3,018,951

MULTI-CHANNEL TAPE DETECTOR

Filed March 6, 1958 3 Sheets-Sheet 1

INVENTOR.
WAYNE W. HARRIS

BY

ATTORNEY

United States Patent Office 3,018,951

Patented Jan. 30, 1962

3,018,951

MULTI-CHANNEL TAPE DETECTOR

Wayne W. Harris, Binghamton, N.Y., assignor to International Business Machines Corporation, New York, N.Y., a corporation of New York Filed Mar. 6, 1958, Ser. No. 719,670
9 Claims. (Cl. 235—61.11)

This invention relates to mechanism for processing control tapes, which, among themselves, vary in width.

More particularly, the invention relates to improvements in tape punches and punched tape readers adapted to operate on tapes of different width and having a variation in the number of data channels therein. The invention is illustrated in reference to a tape reader adapted to read either a 5-channel tape or an 8-channel tape.

Heretofore, tape punches and punched tape readers adapted to operate in more than one mode required manual switching to convert the mechanism from one mode of operation to another. Reliance on manual conversion frequently led to difficulties due to the failure of the operator to make the required adjustments.

It is therefore, the object of this invention to provide means in tape equipment of the class described which will automatically condition itself to operate on tape of different width, and accommodate the control circuits thereof to operate properly in response to the number of tape channels employed.

The objective of the invention is attained by providing a spring biased tape detector for tape processing mechanism which is positioned in a fixed tape path such that it will occupy one operative position when a narrow tape is used, but will assume a second operative position in the presence of a wider tape.

In its more specific aspect, the invention contemplates an improved tape processing mechanism which has a guide block having a tape supporting face, a plurality of aligned tape contacting pins, such as tape reading pins or tape punch pins, mounted to reciprocate through the face of the guide block for either sensing perforations in a tape or punching data representing perforations into the tape, and means for feeding a tape and for guiding it in a fixed path in contact with the face of the guide block. The invention provides a control member mounted in the face of the tape guide block, or in the same plane as said face, at a point which is laterally beyond the path of a narrow tape passing over the guide block, but within the path of a wide tape passing over the guide block, and means under control of the control member for rendering inoperative the function of a predetermined number of the tape contacting pins when a narrow tape is being processed.

A specific embodiment of the invention can best be understood from the following description when read in light of the drawings forming a part of this application, and in which drawings.

Figure 2:
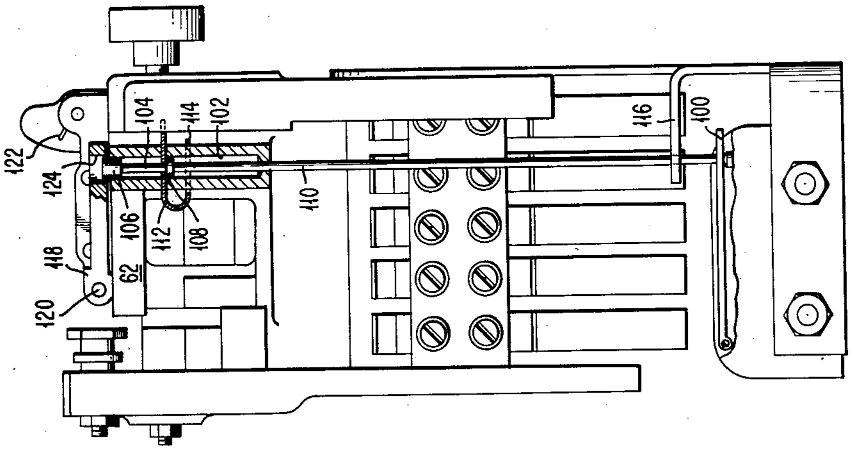
FIG. 2 is an end elevational view of the punched tape reader of FIG. 1.

As stated hereinabove, this invention is applicable to mechanism for reading perforated tape and for punching tape, where mechanism of either class is designed for operating on tape in which the codes employed vary as to the maximum number of transverse positions. The invention herein is illustrated in conjunction with perforated tape reading mechanism adapted to read either a 5-channel tape or an 8-channel tape. The principles of the invention taught in connection with the selected embodiment will enable those skilled in the art to apply the invention with equal ease to tape punch mechanism.

The tape reader, illustrated in the drawings, is substantially like that disclosed in United States Patent 2,619,532, granted to Edwin O. Blodgett on November 25, 1952; therefore, only so much of the reader mechanism will be illustrated and described herein as required to render intelligible the modifications which constitute the invention.

Figure 1:
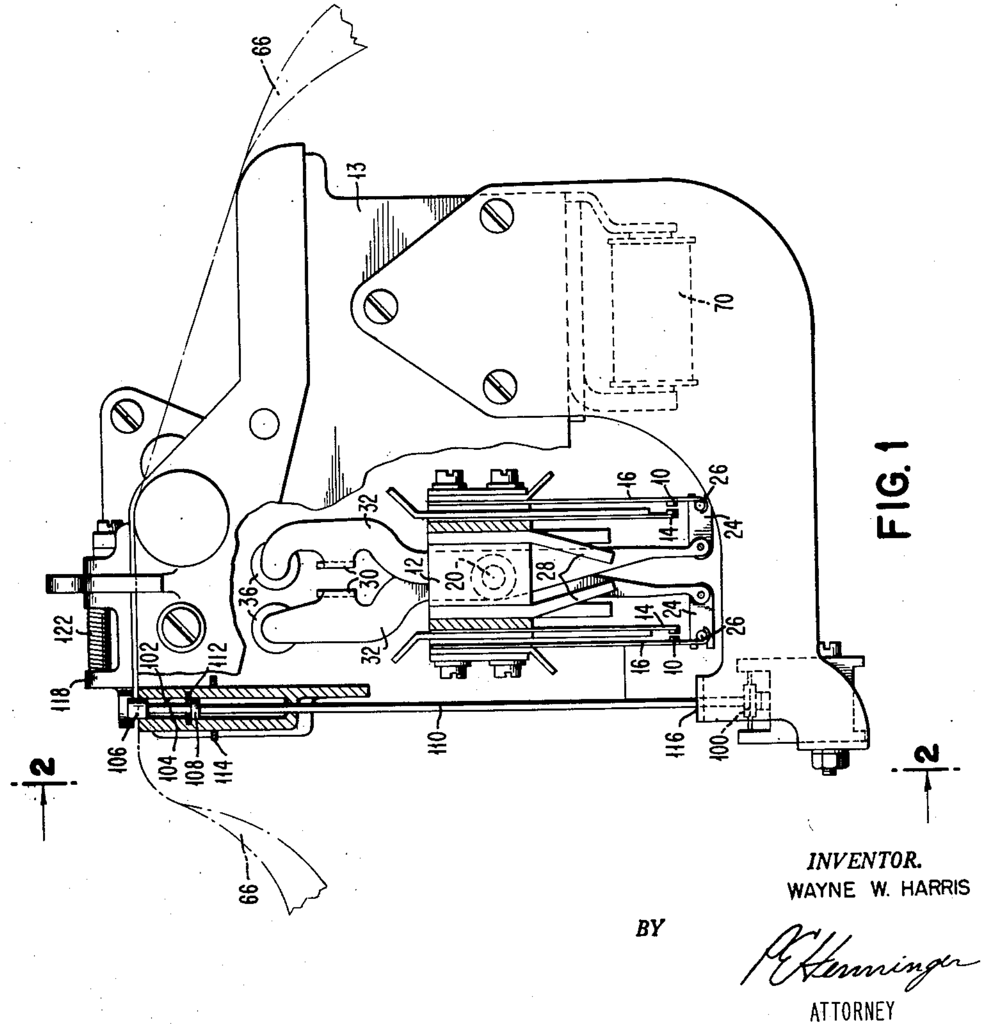
FIG. 1 is a side elevational view of a punched tape reader in which the invention is employed.

By reference to FIG. 1, it will be seen that there are a plurality of paired electrical contacts 10 which are disposed in opposite rows on a supporting structure 12 which is mounted on a base casting 13. Inasmuch as the tape reader herein is designed to sense any one of 8-holes, or any combination thereof, in the control tape, there are 8 contacts under the control of tape perforations. The contacts in the oppositely disposed rows are arranged on the supporting structure 12 in staggered relation so that they may be individually controlled by interposer mechanism which will be more fully described at a later point. Each contact device consists of a fixed contact strip 14 on one end of which is a contact point, and a resiliently movable contact strip 16 which carries a contact point in registration with the point on the fixed strip 14 with which it is paired. The resilient contact strip 16 is normally biased to close the contact points. Each contact device, however, is held open, except when a corresponding tape perforation appears, by means of an offset contact lever 18 shown in FIG. 4 which is mounted for limited swinging movement on a pivot shaft 20, which forms part of the supporting structure 12. Each of the contact levers 18 has a free end 22 (FIG. 4), which when moved outwardly causes the contact operating end thereof to move outwardly also by reason of the fact that paired contact levers are arranged in scissor-fashion and cross each other at the pivot shaft 20. The contact operating end of each lever has pivoted thereto a short outwardly extending projection 24 which is notched to engage an upwardly extending section 26 of the associated resilient contact strip 16. As a result of this structure, when the lower free ends 22 of the contact levers 18 are moved outwardly, the upper ends move outwardly, whereby the contact points on the associated contact strips are opened.

The contact levers 18 are guided in their movement by a pair of guide combs 28 and the movement of these levers is partially under control of a pair of contact lever bails 30; one such contact lever bail 30 being adapted to engage the lower free ends 22 of a related set of contact levers. Thus, when the contact lever bails 30 are moved toward each other, any contact lever which is at such time otherwise free, will permit its associated resilient conducting strip 16 to move inwardly to close the contact points thereof. The contact lever bail assembly includes a pair of yoke-like members 32 composed of a pair of spaced straps interconnected by a contact lever bail 30. One end of each strap is pivoted on the pivot shaft 20, and the other end of each has mounted thereon a roller 36. The contact lever bail assemblies are interconnected by a spring (not shown) whereby they are urged toward each other, but they are kept in normally separate position by means of interposer bail studs 38 (FIG. 4) which are adapted to move between the rollers 36 at each end of the assembly. When the studs 38 are disposed between the rollers 36, the contact lever bail assembly is separated, the contact lever bails 30 are in contact with the free ends 22 of the contact levers 18, and as a consequence, the contact points on the contact strips are separated.

The studs 38 are carried by an interposer bail assembly 40 which, in turn, is pivoted on a pivot shaft 42. The interposer bail assembly 40 includes a pair of spaced side arms 44 (only one being visible in FIG. 4) on the free end of each of which is located a stud 38 and from which it projects into position between the rollers 36. An interposer bail 46 interconnects the side arms 44 of the interposer bail assembly, and this bail is adapted to overlie and to control a series of interposers as will be more fully described hereinafter. Furthermore, the interposer bail assembly has attached thereto an interposer bail arm 48 by means of which the forwardly projecting arms 44 may be rocked about the pivot shaft 42 on which they are mounted. The free end of the interposer bail arm 48 has a cam follower 50 mounted thereon and which is adapted to operate in contact with an interposer bail cam 52 whenever the interposer bail arm 48 is released from the influence of a control arm 54, as will be more fully explained hereinafter.

Figure 4:
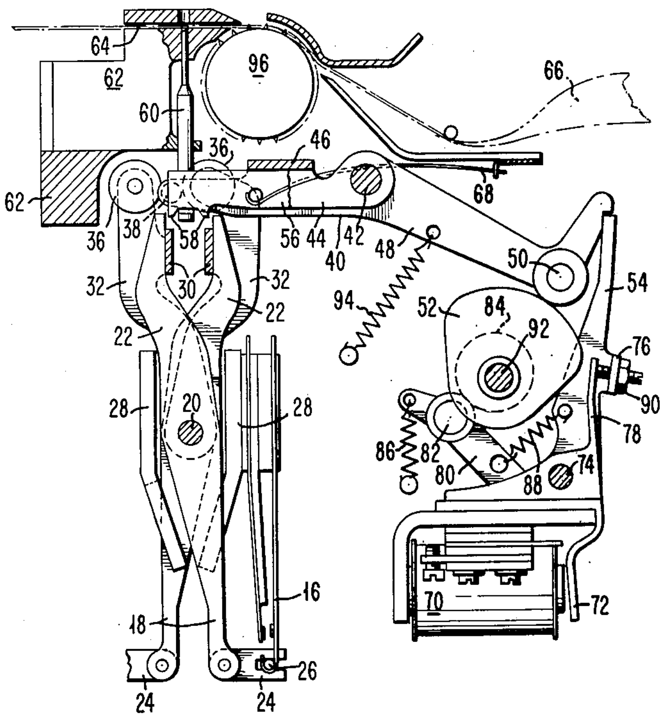
FIG. 4 is a vertical cross-sectional view through the punched tape reader of FIG. 1, certain elements being removed to simplify the view.

The operation of the tape control contact assembly, as heretofore described, is under the ultimate control of a series of interposer arms 56 which are arranged between the spaced side arms 44 of the interposer bail assembly 40, one such arm being provided for each tape controlled contact lever. As best seen in FIG. 4 of the drawings, the interposer arms 56 are freely pivoted on the shaft 42 on which they are mounted, and each consists of a lever having a pair of interposer shoulders 58 formed at the free end thereof. One shoulder 58 of each interposer arm is associated with the free end 22 of its corresponding contact lever. In the inoperative position of the device, the interposer arms will be positioned as shown in FIG. 4 of the drawings, with one of its shoulders 58 in blocking or interposing relation with its associated contact lever. It can be seen, therefore, that even though the contact lever bails 30 are released, any contact lever whose interposer arm 56 is in blocking position will be restrained from movement and consequently its associated contacts will remain open.

Carried by each interposer arm is a tape reading pin 60, which is guided for reciprocating movement in a reading pin guide block 62. The path of the reading pins 60 intersects a tape feed throat 64 in the guide block 62. As a perforated tape 66 is fed through the tape feed throat 64, the reading pins 60 will be in light contact therewith by reason of the fact that each interposer arm 56 is under the influence of a light spring 68. The tension of the spring 68 is insufficient to cause any damage to the tape being read. However, the spring tension is sufficient to cause a reading pin 60 to enter a tape perforation in alignment therein at the reading station. When this relationship is present, the corresponding pin 60 will enter the tape perforation, causing the interposer arm 56 to swing on its pivot shaft 42 sufficiently to withdraw the blocking interposer shoulder 58 from the path of its associated contact lever. Under these conditions, when the contact lever bails 30 are moved inwardly away from the free ends 22 of the contact levers, a contact lever thus freed will move sufficiently to close its associated contact points. In the absence of a perforation in the tape, the reading pins will rest lightly against the surface of the tape, thus preventing the associated interposer arms 56 from moving out of the path of the contact levers, restraining their movement and avoiding the operation of their associated contacts. Whenever the interposer bail 46 is down as shown in FIG. 4, the interposer arms 56 will be held in non-reading position. It will be noted in FIG. 4 that the interposer bail 46 overlies and is adapted to contact the upper edge of the aligned interposer arms.

The interposer arms 56 and consequently the reading pins 60 are retained in non-reading position by the interposer bail 46 until the interposer bail arm 48 is released by the control arm 54. Such release follows energization of a control magnet 70 (FIG. 4) in connection with which operates an armature 72 which is pivoted on a stud shaft 74 about which the armature may rock. The control arm 54 is likewise pivoted on the stud shaft 74. The armature 72 is a bifurcated structure having a laterally extending stop finger 76 adapted to limit its rocking movement about the shaft 74 by contact with an armature yoke 78. A second extension 80 of the armature structure lies substantially parallel but in forwardly spaced relation in respect to the stop finger 76, and the free end of this latter extension mounts a cam following roller 82 adapted to contact an armature knock-off cam 84. A spring 86 normally biases the armature 72 away from the core of the control magnet 70 but in order to render the action of the armature 72 positive in overcoming residual magnetism in the core of the magnet 70, the armature knock-off cam 84 is arranged to permit positive rocking of the armature away from the core immediately after the energizing pulse has been removed. Conjoining action of the control arm 54 and the armature 72 is achieved by the use of an interconnecting spring 88 and the relative adjustment of the two members is achieved through an adjusting screw 90 mounted in a flange of the control arm in such position as to contact the free end of the armature.

The interposer cam 52 and the armature knock-off cam 84, as will appear hereinafter, are mounted for rotation on a constantly rotating power shaft 92. The power shaft 92 and consequently the cams thereon are continuously rotated, but tape reading operations are not performed until the control magnet 70 is energized. When an energizing current is present in the control magnet 70, the armature 72 is attracted to the magnet core with the result that the control arm 54 is rocked, thereby releasing the interposer bail arm 48. The interposer bail arm 48 is under the influence of a spring 94 (FIG. 4) which is effective to draw the cam follower 50 of the interposer bail arm into contact with the interposer bail cam 52. As the interposer bail cam 52 rotates, the interposer bail arm 48 rocks about the pivot shaft 42 and raises the interposer bail assembly 40. As a result of this action, the interposers 56 are permitted to move under the influence of their respective spring 68 and the reading pins 60 will enter any tape perforations that are present in alignment with the respective pins.

When one or more of the reading pins enters a perforation in the tape, the interposer 56 associated therewith moves sufficiently to free the interposer shoulder 58 from blocking engagement with its associated contact lever 18, so that when the interposer studs 38 move from between the contact lever bail rollers 36, the contact lever, or levers, thus freed of the interposer shoulders will move inwardly under the influence of the resilient contact strap 16 and permit contacts of such operated contact lever or levers to close.

As the interposer bail cam 52 rotates and its high point rides in contact with the interposer bail cam follower 50, the interposer bail arm assembly is rocked in the opposite direction about its pivot shaft 42 and the control arm 54 is moved inwardly under the influence of the spring 88, so as to be in position to intercept the latch end of the interposer bail arm 48 as it rises, thereby holding it out of further contact with the interposer bail cam 52 and sustaining it against the influence of the spring 94. In this position, the reading mechanism will again be latched, the interposer bail 46 having depressed the interposer arms 58 into contact lever blocking position, and the contact levers have been separated by contact with the lever bails 30 upon separation of the contact lever bail assembly structure by the interposer bail studs 38. A second tape reading operation cannot follow, therefore, until the control magnet is once again energized; in the meanwhile a tape feed sprocket 96 will be rotated to advance the tape to the next following position.

Figure 5:
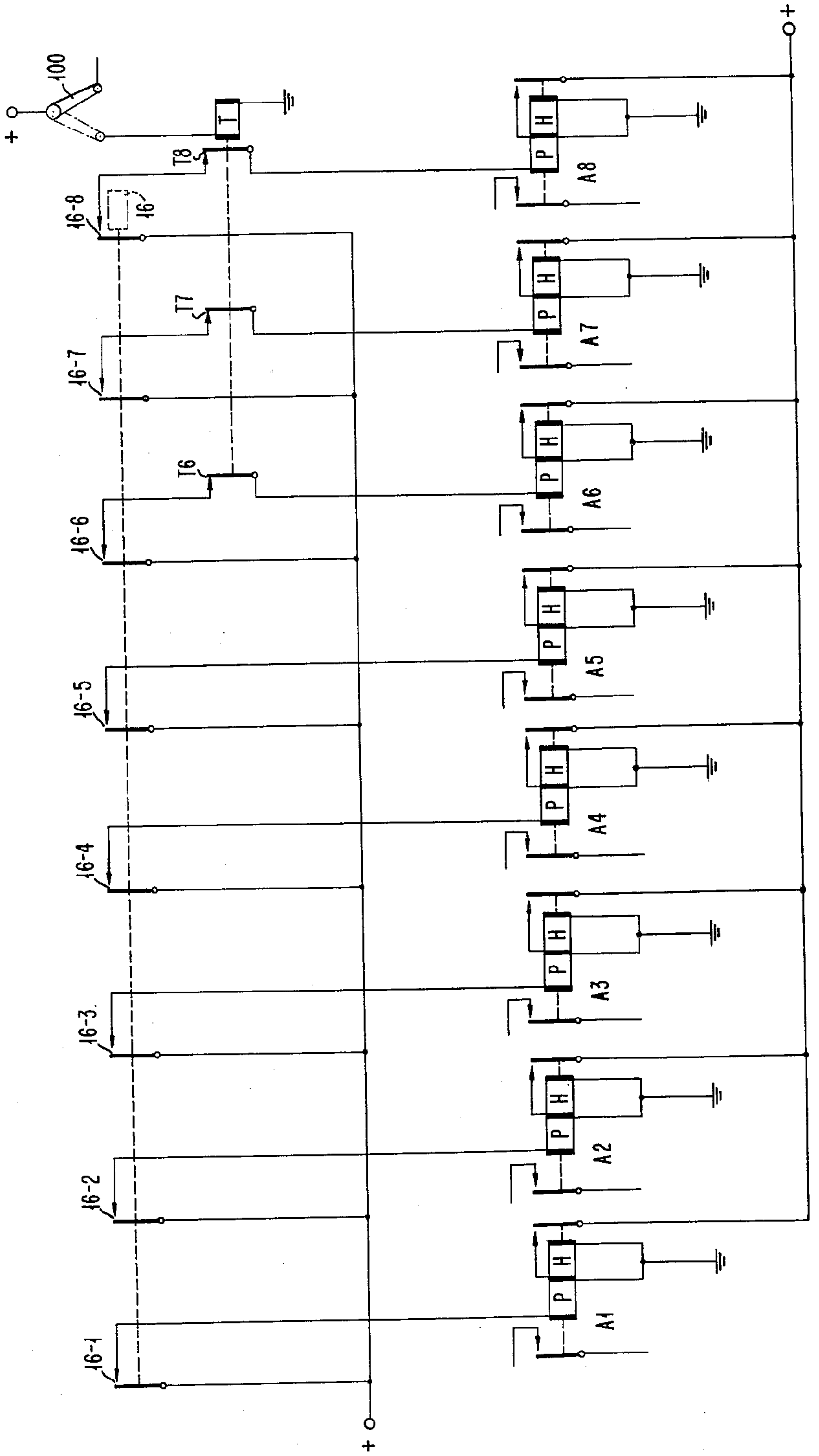
FIG. 5 is a diagrammatic representation of the first level of a code analyzing network.

FIG. 5 is a diagrammatic representation of the first level of a code translating network in which the contacts 16–1 through 16–8 represent the contacts controlled by the pins 60 of FIG. 4. Since eight contacts are provided, the system is capable of reading an 8-channel tape. In the conventional 8-channel tape, the first 5 code positions represented by the contacts 16–1 through 16–5 are the data representing positions, while the channels corresponding to the contacts 16–6 through 16–8 are usually functional positions. For example, the sixth channel of an 8-channel tape is customarily a redundancy check channel, while the seventh channel and eighth channel are customarily class selection channels. When a control tape is specifically generated for use in data processing or computing equipment, use is ordinarily made of all eight channels on the tape. However, in order to adapt data processing and computing equipment to operate on data transmitted through commercial communication systems which ordinarily employ codes having only five positions, representative of data only, provision must be made for disabling the tape processing equipment at tape channels which do not correspond to the five so utilized. Heretofore, tape punching and tape reading equipment has been adapted to operate on either 5-channel tape or 8-channel tape, for example, and conversion of the equipment adapting it to the processing of either an 8-channel or a 5-channel tape has been made by means of manual switching. This has resulted on occasions in serious difficulties because of the failure of operating personnel to manually adjust the equipment to the tape being processed. Herein, the human factor and consequently the opportunity for error has been eliminated by providing a control member which automatically adapts the equipment to the width of the tape being processed by placing a control member under the influence of the tape that is being processed. The invention takes advantage of the fact that the width of control tape bears a relation to the number of longitudinal recording channels therein. Thus, a 5-channel tape is relatively narrow as compared to an 8-channel tape.

In the diagrammatic circuit of FIG. 5, each of the contact points 16–1 through 16–8 are required for processing an 8-channel tape, for example, but only the contact points 16–1 through 16–5 are utilized for processing a 5-channel tape. Therefore, while processing a 5-channel tape, precaution must be taken to render inoperative the contacts 16–6 through 16–8.

Whenever any one of the contacts 16–1 through 16–5 is closed, a related relay will be energized to close appropriate relay points in a translating or analyzing circuit according to conventional practice. On the other hand, closure of the contact points 16–6 through 16–8 will be effective to energize their respective relays in the group A–6 through A–8 only if a control point in the respective relay circuits is closed. Thus, the circuits of relays A–6, A–7 and A–8 have therein relay points T6, T7 and T8, respectively, which when closed will permit energization of the respective relays, providing the respectively related sensing contacts 16–6, 16–7 and 16–8 are closed.

The closed position of the contacts T6, T7 and T8 is that which normally prevails when an 8-channel tape is being processed. However, when a 5-channel tape is to be processed, the contacts T6, T7 and T8 must be opened so that their respective relays A–6, A–7 and A–8 will not be picked up when the respective sensing contacts 16–6, 16–7 and 16–8 are closed.

In the diagrammatic circuit of FIG. 5 the disabling of the contacts 16–6, 16–7 and 16–8 is brought about by energizing a relay T which controls the relay points T6, T7 and T8. The relay T is under control of the operating blade 100 of a tape width detector switch which is normally in its open or full line position, as viewed in FIG. 5. However, if the blade 100 of the switch is shifted to the broken line position of FIG. 5, the relay T will be energized and its points T6, T7 and T8 will be opened. The invention herein contemplates the use of special mechanism under control of a tape being processed for operating the switch blade 100.

Figure 3:
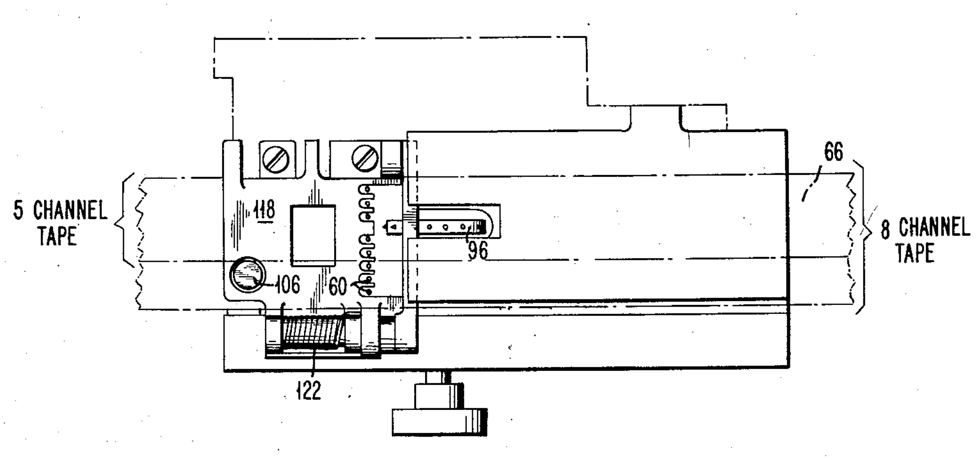
FIG. 3 is a plan view of the punched tape reader of FIG. 1 showing the relative position occupied therein by a 5-channel and an 8-channel tape.

Reference to FIGS. 1, 2 and 3 will disclose the specific nature of one form of mechanism which is contemplated. The guide block 62 has formed therein a guide passage 102 adapted to mount a tape guide pin 104 for reciprocation in the guide block 62. The guide pin includes a head 106 and a boss 108 which have a diameter only slightly less than the diameter of the passage 102 such that the guide pin will be supported when it is reciprocated in the guide passage 102. The depending end of the guide pin constitutes a tape sensing and switch actuating rod 110 which extends downwardly into contact with the blade 100 of the tape width detector switch. The tape guide pin 104 passes adjacent to a resilient clip 112 positioned on the guide block 62 such that the boss 108 limits the upward movement of the guide pin 104. The upper turn of the clip 112 constitutes a spring finger through which the tape sensing and switch actuating rod 110 extends and against which the bass 108 rests when biased upwardly by the tape width detector switch blade 100. At the bottom end of the tape sensing and switch actuating rod 110 it passes through a further guide member 116.

As shown in FIG. 2 of the drawings, the tape width detector switch blade 100 is biased upwardly such that the switch is open. The head 106 at the upper end of the tape guide pin 104 extends slightly above the face of the guide block 62, and in this position it defines the width of a narrow tape, for example, a 5-channel tape. This location of the tape guide pin 104 makes it possible to utilize the upper projecting head 106 of the tape guide pin as a guide member against which one lateral edge of a tape may engage as it passes over the face of the guide block 62.

When the tape sensing and switch actuating rod 110 is in its projected or upward position, as shown in FIG. 2 while reading the narrow tape, the tape width detector switch blade 100 will be closed into the broken line position of FIG. 5. Under these conditions, the relay T will be energized and its points T6, T7 and T8 will be opened, so that the respectively associated relays A–6, A–7 and A–8 cannot be energized. When an 8-channel tape is inserted into the reader, the tape will overlie the head 106 of the guide pin 104, as indicated by the dot-dash outline in FIG. 3. The 8-channel tape will, therefore, keep the tape sensing and switch actuating rod 110 depressed. In the depressed position of the tape sensing and switch actuating rod 110, the tape width detector switch blade 100 will be open as shown in the full line position of FIG. 5. Under these conditions, the relay T of FIG. 5 will be deenergized and the points T6, T7 and T8 thereof will be closed. In the closed position of the relay points T6, T7 and T8, a circuit is completed to the relays A–6, A–7 and A–8, respectively, such that these relays will be energized when their respective contacts 16–6, 16–7 and 16–8 are closed.

A tape gate 118 is hinged on a pintle 120 at one edge of the guide block 62 such that it may be raised for inserting a tape thereunder. A spring 122 biases a latch on the gate 118 to lock the gate in its closed position. By reference to FIG. 2, it can be seen that the gate 118 has an aperture 124 therein which is co-axial with the guide block passage 102. The passage 124 in the gate permits the head 106 of the tape guide pin 104 to project well above the face of the guide block 62 and thereby enhance the function of the pin as a tape guide.

FIG. 5 shows the relay T deenergized and its contacts T6, T7 and T8 closed. This adapts the circuit to the reading of an 8-channel tape, as stated. Whether the relay contacts T6, T7 and T8 are open or whether they are closed upon energization of the relay T is a matter of choice, depending on whether the machine is expected to operate mainly upon a wide tape or a narrow tape; it being preferred to arrange the relay circuit such that the relay T need be energized only while processing a tape of the width expected to be used least frequently.

While the fundamentally novel features of the invention have been illustrated and described in connection with tape reading mechanism of the kind shown in the above-mentioned Blodgett patent, it is clear that this illustrative embodiment will enable others skilled in the art to apply the principles of the invention to other forms of tape reading equipment and also to tape perforating equipment of the general character shown in United States Patent 2,346,267, granted to A. W. Mills et al. on April 11, 1944. Therefore, when the term "tape contacting pins" is read in the following claims, it should be construed as identifying either tape reading pins as specifically described herein, or as tape punch pins like those shown in the Mills et al. patent.

It is apparent also that tape reading and perforating systems can be provided in which both the tape reading and the tape perforating units are provided with individual tape width detecting devices of the type herein disclosed, which are adapted to control their respective units and/or to have a mutual controlling effect upon each other as may be desired.

What is claimed is:

1. In a mechanism for processing both wide and narrow control tapes, a guide block having a tape supporting face, a plurality of aligned tape pins mounted for movement through said face of said guide block, means for feeding a control tape and for guiding the same in a fixed path in contact with said face of said guide block, a control means for sensing the presence or absence of a control tape mounted in the face of said guide block outside the path of a narrow tape passing over said guide block but within the path of a wider tape passing over said guide block, and means under control of said control means for rendering ineffective a selected number of said pins when a narrow tape is being fed over said guide block.

2. In a mechanism for processing both wide and narrow control tapes, a guide block having a tape supporting face, a plurality of aligned tape pins mounted for movement through said face of said guide block, means for feeding a control tape and for guiding the same in a fixed path in contact with said face of said guide block, a control means for sensing the presence or absence of a control tape mounted for reciprocation in the face of said guide block outside the path of a narrow tape passing over said guide block but within the path of a wider tape passing over said guide block, an electrical control circuit connected with each of said pins, and a switch under control of said control means for rendering ineffective the control circuits of a selected number of said pins when a narrow tape is being fed over said guide block.

3. In a mechanism for processing both wide and narrow control tapes, a guide block having a tape supporting face, a plurality of aligned tape pins mounted for movement through said face of said guide block, means for feeding a control tape and for guiding the same in a fixed path in contact with said face of said guide block, a control means for sensing the presence or absence of a control tape mounted in the face of said guide block outside the path of a narrow tape passing over said guide block but within the path of a wider tape passing over said guide block, a control circuit connected with each of said pins, a relay for controlling a selected number of said control circuits, and means under control of said control means for energizing said relay thereby rendering ineffective a selected number of said pins when a narrow tape is being fed over said guide block.

4. In a mechanism for processing control tapes, a guide block having a tape supporting face, a plurality of aligned tape pins mounted for movement through said face of said guide block, means for feeding a control tape and for guiding the same in a fixed path in contact with said face of said guide block, a control means for sensing the presence or absence of a control tape projecting from said face of said guide block in the path of a tape passing over said guide block, means normally rendering ineffective a selected number of said pins, and means under control of said control means for rendering operative said normally ineffective pins when said control means is depressed by a tape passing over said guide block.

5. In a mechanism for processing control tapes, a guide block having a tape supporting face, a plurality of aligned tape pins mounted for movement through said face of said guide block, means for feeding a control tape and for guiding the same in a fixed path in contact with said face of said guide block, a control means for sensing the presence or absence of a control tape mounted for reciprocation in said guide block, spring means for projecting said control means from said face of said guide block into the path of a tape passing over said guide block, means normally rendering ineffective a selected number of said pins, and means under control of said control means for rendering operative said normally ineffective pins when said control means is depressed by a tape passing over said guide block.

6. In a mechanism for processing control tapes, a guide block having a tape supporting face, a plurality of aligned tape pins mounted for movement through said face of said guide block, means for feeding a control tape and for guiding the same in fixed path in contact with said face of said guide block, a control means for sensing the presence or absence of a control tape projecting from said face of said guide block in the path of a tape passing over said guide block, a relay controlled circuit for normally rendering ineffective a selected number of said pins, and means under control of said control means for controlling said relay circuit to render operative said normally ineffective pins when said control means is depressed by a tape passing over said guide block.

7. In a mechanism for processing control tapes, a guide block having a tape supporting face, a plurality of aligned tape pins mounted for movement through said face of said guide block, means for feeding a control tape and for guiding the same in a fixed path in contact with said face of said guide block, a control means for sensing the presence or absence of a control tape projecting from said face of said guide block in the path of a tape passing over said guide block, means normally rendering ineffective a selected number of said pins, an activating circuit connected with each of said normally ineffective pins, and means under control of said control means for energizing said activating circuits when said control means is depressed by a tape passing over said guide block.

8. In a mechanism for processing control tapes, a guide block having a tape supporting face, a plurality of aligned tape pins mounted for movement through said face of said guide block, means for feeding a control tape and for guiding the same in a fixed path in contact with said face of said guide block, a control means for sensing the presence or absence of a control tape projecting from said face of said guide block in the path of a tape passing over said guide block, means normally rendering ineffective a selected number of said pins, an activating circuit connected with each of said normally ineffective pins, a relay for controlling said activating circuits, and means under control of said control means for energizing said relay when said control means is depressed by a tape passing over said guide block.

9. In a mechanism for processing control tapes, a guide block having a tape supporting face, a plurality of aligned tape pins mounted for movement through said face of said guide block, means for feeding a control tape and for guiding the same in a fixed path in contact with said face of said guide block, a control means for sensing the presence or absence of a control tape mounted for reciprocation in said guide block, spring means for projecting said control means from said face of said guide block into the path of a tape passing over said guide block, means normally rendering ineffective a selected number of said pins, an activating circuit connected with each of said normally ineffective pins, and means under control of said control means for energizing said activating circuits when said control means is depressed by a tape passing over said guide block.

References Cited in the file of this patent

UNITED STATES PATENTS 2,377,978 Steeneck ---------------- June 12, 1945
2,464,601 Nichols ---------------- Mar. 15, 1949
2,517,984 Cunningham ---------------- Aug. 8, 1950
2,619,532 Blodgett ---------------- Nov. 25, 1952

FOREIGN PATENTS 940,593 Germany ---------------- Mar. 22, 1956